March 28, 1939.　　　R. B. PARROTT　　　2,151,934
WINDOW LOCK
Filed Aug. 17, 1936
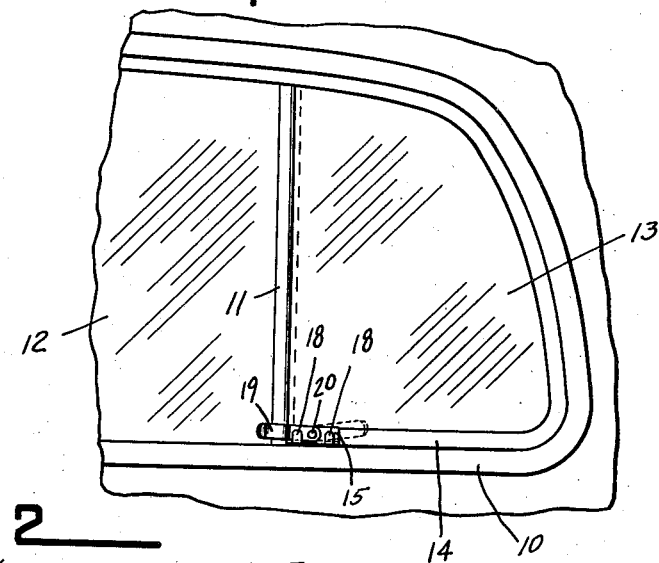
INVENTOR.
ROBERT B. PARROTT.
BY
Lockwood, Goldsmith & Gast
ATTORNEYS.

Patented Mar. 28, 1939

2,151,934

UNITED STATES PATENT OFFICE 2,151,934

WINDOW LOCK

Robert B. Parrott, Indianapolis, Ind.

Application August 17, 1936, Serial No. 96,461

3 Claims. (Cl. 292—337)

This invention relates to a locking device adapted for ready installation on so-called "no-draft" ventilators commonly used on various makes of automobile body windows.

This type of automobile window ventilator, which comprises a section of the window and wherein the main section of the window is adapted to be moved upwardly and downwardly into the door casing, is adapted to swing about a vertically extending pivotal mounting so as to act in conjunction with the main section of the window for controlling drafts and ventilation.

In vehicles embodying such window construction and ventilators, provision is made for swinging the ventilator section to open and closed position by turning a handle on the interior of the door. Furthermore, provision is made for locking the door to prevent access to the interior of the vehicle. However, it is possible to gain access to the interior for pilfering by inserting an instrument between the ventilating section and the main section of the window, springing the ventilator section outwardly about its pivotal mounting sufficiently to insert a thin hook or wire which will engage the handle and permit it to be turned to thereby swing the ventilator to full open position, whereupon the door may be unlocked from the inside and the vehicle entered. It is the object of this invention to provide a lock adapted to be readily mounted on the ventilator for locking it with the vertical support of the main section of the window such as will prevent its being pried and sprung outwardly in the manner above described.

The lock comprises a channel-shaped support adapted to be slidably mounted over the outer end of the bottom of the ventilator frame, upon which a locking arm or plate is pivotally mounted which may be moved into engagement with the inner surface of the rigid upright frame member.

The full nature of the invention will be understood from the accompanying drawing and the following description and claims:

Fig. 1 is a view of the inner side of the vehicle window showing the main section and ventilating section in closed position. Fig. 2 is an enlarged section taken on the line 2—2 of Fig. 1. Fig. 3 is a perspective view of the locking attachment. Fig. 4 is a section taken on the line 4—4 of Fig. 2.

In the drawing there is illustrated a vehicle window frame 10 which is separated in two parts by a permanent and rigid vertically extending side frame member 11. On one side of the member 11 there is provided a vertically slidable window 12, and on the other side thereof, a ventilating window 13. Said ventilating window 13 is mounted in a frame having a bottom member 14, said frame being pivotally mounted about a vertical axis on the frame 10 to permit the ventilator 13 to be swung to and from ventilating position by an interiorly positioned operating handle, not shown herein.

Slidably mounted over the frame member 14, from the end thereof adjacent the frame member 11, there is a channel-shaped support 15 provided with a closed end member 16 and inwardly extending flanges 17. When mounted in position, the channel support embraces the end portion of the frame member 14 and the flanges 17 engage the side surfaces of the window section 13 immediately above the said frame member, as illustrated in Fig. 4.

Said channel support is formed of a metal stamping with the end 16 cut out and bent over to close the end of the channel but spaced from the side wall opposite the bent side so as to permit of flexing or spring action between the two side walls so that the flanges 17 may be slightly sprung apart upon engagement with the glass 13 to make a tight fit under spring tension. On the inner wall of the support the ears 18 are formed for receiving and locking the pivotal locking plate 19 against lateral movement, which plate has one end pivoted to the side wall of the support by the rivet 20 intermediate the ears 18. The outer free end of the plate 19 is bent outwardly to extend in the plane of the inner surface of the frame member 11 so as to engage therewith when in locking position.

In operation, upon the channel support being mounted upon the ventilator frame, it will securely lock the ventilator against being sprung outwardly when the plate 19 is moved to the position shown in Figs. 1, 2 and 3 for engagement with the inner surface of the rigid frame member 11. When it is desired to utilize the ventilating section in the usual manner, the plate 19 is swung about its pivotal mounting to the position shown in dotted lines in Figs. 1 and 3.

The foregoing specification describes the preferred form of the invention. The details thereof may be varied by those skilled in the art without departing from the scope of the invention as defined by the appended claims. For example, the lock may be mounted adjacent the upper edge of the window instead of adjacent the lower edge as specifically shown and described.

The invention claimed is:

1. A window lock for locking a swinging window frame to a rigid frame member comprising a channel-shaped support adapted to slide over a portion of said window frame adjacent the rigid frame member, a locking plate pivotally mounted upon one side of said support in position to extend into engagement with said rigid frame member when in locking position and be swung out of engagement therewith when in unlocking position, and an end piece bent inwardly from one side of said support to a position adjacent to but separated from the opposite side thereof for closing the end of said support while permitting flexing of the side walls thereof.

2. A window lock for locking a swinging window frame to a rigid frame member comprising a channel-shaped support adapted to slide over that end of said window frame lying adjacent said rigid frame member, said support having a pair of side walls, inwardly extending flanges adapted to abut opposite sides of the window glass and an end wall, said end wall being integral with one side of the support and bent inwardly with its free edge lying adjacent to but separated from the opposite side wall and bottom thereof for closing one end of the support while permitting flexing of the walls to provide engagement of the flanges with said window under spring tension, an upwardly extending ear formed in one of said walls and spaced therefrom, and a locking plate pivoted to said last-mentioned wall intermediate its ends for swinging engagement into locking position with said rigid frame member and away therefrom.

3. A window lock for locking a swinging window frame to a rigid frame member comprising a channel-shaped support adapted to slide over that portion of the lower edge of said window frame lying adjacent said rigid member, said support having a bottom and a pair of upstanding side walls, an inwardly extending flange formed on the upper side of each of said side walls adapted to abut the side surface of the window glass carried by said frame, an end wall formed on said support for engaging the end of said frame to limit the sliding movement of said support inwardly thereof, and a locking member pivotally mounted on said support for movement in and out of locking engagement with said rigid frame member.

ROBERT B. PARROTT.